UNITED STATES PATENT OFFICE.

JAMES J. ROGERS, OF BINGHAMTON, NEW YORK.

IMPROVEMENT IN BIRCH BEER.

Specification forming part of Letters Patent No. 198,467, dated December 25, 1877; application filed October 31, 1877.

*To all whom it may concern:*

Be it known that I, JAMES J. ROGERS, of the city of Binghamton, in the State of New York, have invented a new and useful composition called "Birch Beer," which composition is fully described in the following specification:

This invention relates to that class of fashionable drinks which are pleasant to the taste, and healthful as a beverage; and it consists in a mixture of water, sugar, oil of birch cut in alcohol, home-made yeast, and burnt sugar, which ingredients are prepared and compounded substantially in the following manner and proportions: Take a quantity of water—say, a barrel, or about thirty-two gallons of water—and in it dissolve twenty-five pounds of sugar, the kind called "A" sugar being preferable; add an ounce and a half of oil of birch cut in a pint of alcohol; warm the whole liquid to a lukewarm temperature, and add one pint of home-made yeast; also, add one-half pound of burnt sugar, first having dissolved and carefully strained the same. Then allow it to stand eighteen hours and skim it. After that, rack off the liquid into kegs or bottles, and cork tightly. Then let it stand about eighteen hours in a warm place, and it will be ready for use.

The beverage made as above described makes a very healthful and pleasant drink. When properly bottled and corked it will keep any length of time, and grows stronger with age. It can be manufactured and used both in summer and winter.

The burnt sugar gives color to the liquid, which may be increased or diminished, as desired, by varying the amount of the sugar.

I claim—

The improved material herein described for producing beer, called "birch beer," and consisting of water, sugar, oil of birch, alcohol, home-made yeast, and burnt sugar, in the proportions substantially as specified.

In witness whereof I have hereunto set my hand this 26th day of October, A. D. 1877.

JAMES J. ROGERS.

Witnesses:
 DORR C. SMITH,
 W. F. COGSWELL.